(12) United States Patent
Moser

(10) Patent No.: US 11,237,945 B2
(45) Date of Patent: Feb. 1, 2022

(54) CONFIGURATION CONTENT INTEGRATION

(71) Applicant: SAP SE, Walldorf (DE)

(72) Inventor: Martin Moser, Speyer (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/851,417

(22) Filed: Apr. 17, 2020

(65) Prior Publication Data

US 2021/0326237 A1    Oct. 21, 2021

(51) Int. Cl.
| | |
|---|---|
| G06F 11/36 | (2006.01) |
| G06F 8/71 | (2018.01) |
| G06F 16/22 | (2019.01) |
| G06F 9/445 | (2018.01) |
| G06F 8/65 | (2018.01) |

(52) U.S. Cl.
CPC ............ *G06F 11/3612* (2013.01); *G06F 8/65* (2013.01); *G06F 8/71* (2013.01); *G06F 9/44505* (2013.01); *G06F 16/221* (2019.01)

(58) Field of Classification Search
None
See application file for complete search history.

(56) References Cited

U.S. PATENT DOCUMENTS

| | | | | |
|---|---|---|---|---|
| 7,200,651 B1* | 4/2007 | Niemi | ...................... | G06F 8/65 709/223 |
| 7,428,726 B1* | 9/2008 | Cowan | .................. | G06F 11/368 717/121 |
| 7,840,955 B1* | 11/2010 | Weathersby | .............. | G06F 8/60 717/168 |
| 8,533,336 B1* | 9/2013 | Scheffler | ................... | G06F 8/61 709/226 |
| 9,280,339 B1* | 3/2016 | Prunicki | ................... | G06F 8/76 |
| 10,579,966 B1* | 3/2020 | Willson | .................... | G06F 8/30 |
| 10,936,333 B2* | 3/2021 | Mickelsson | ......... | G06F 9/44505 |
| 2005/0223374 A1* | 10/2005 | Wishart | ............. | G06F 11/1417 717/173 |
| 2012/0272204 A1* | 10/2012 | Olewski | ................... | G06F 8/71 717/100 |

(Continued)

FOREIGN PATENT DOCUMENTS

CN    106528182 A  * 12/2016

OTHER PUBLICATIONS

Stackoverflow, "How to unzip a file using the command line", 2009, https://stackoverflow.com/questions/1021557/how-to-unzip-a-file-using-the-command-line (Year: 2009).*

*Primary Examiner* — Hossain M Morshed
(74) *Attorney, Agent, or Firm* — Buckley, Maschoff & Talwalkar LLC

(57) ABSTRACT

Provided is a system and method for building and consuming configuration content for software applications and services. In one example, the method may include receiving a request associated with a software program, detecting a reference to a configuration object within a file of the software program, translating attributes of the configuration object into predefined locations of the software program during a build of the software program, and transmitting the built software program to a host platform with the transformed attributes of the configuration object incorporated therein.

21 Claims, 8 Drawing Sheets

(56) References Cited

U.S. PATENT DOCUMENTS

| | | | |
|---|---|---|---|
| 2013/0013670 A1* | 1/2013 | Lim | G06F 9/44505 |
| | | | 709/203 |
| 2013/0080997 A1* | 3/2013 | Dattathreya | G06F 8/71 |
| | | | 717/121 |
| 2015/0089515 A1* | 3/2015 | Bondada | G06F 9/4411 |
| | | | 719/327 |
| 2018/0088935 A1* | 3/2018 | Church | G06F 11/3051 |
| 2018/0321358 A1* | 11/2018 | Carswell | G01S 7/288 |
| 2019/0196793 A1* | 6/2019 | Jaiprakash | G06F 8/34 |
| 2020/0125238 A1* | 4/2020 | Vadapandeshwara | |
| | | | G06F 16/9024 |
| 2020/0272669 A1* | 8/2020 | Ebbesen | G06F 16/957 |
| 2021/0064360 A1* | 3/2021 | Moser | G06F 9/541 |

\* cited by examiner

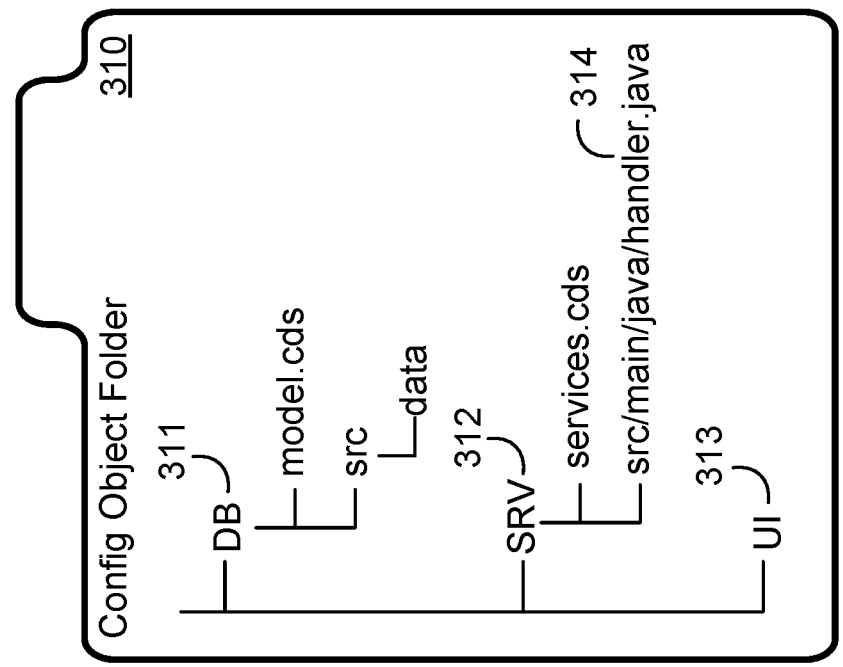
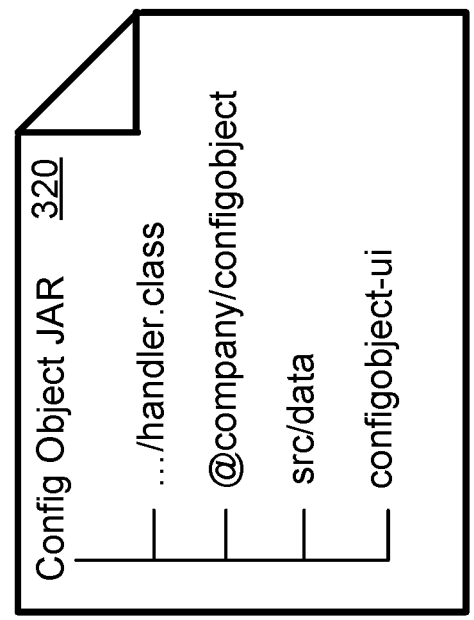
FIG. 3A

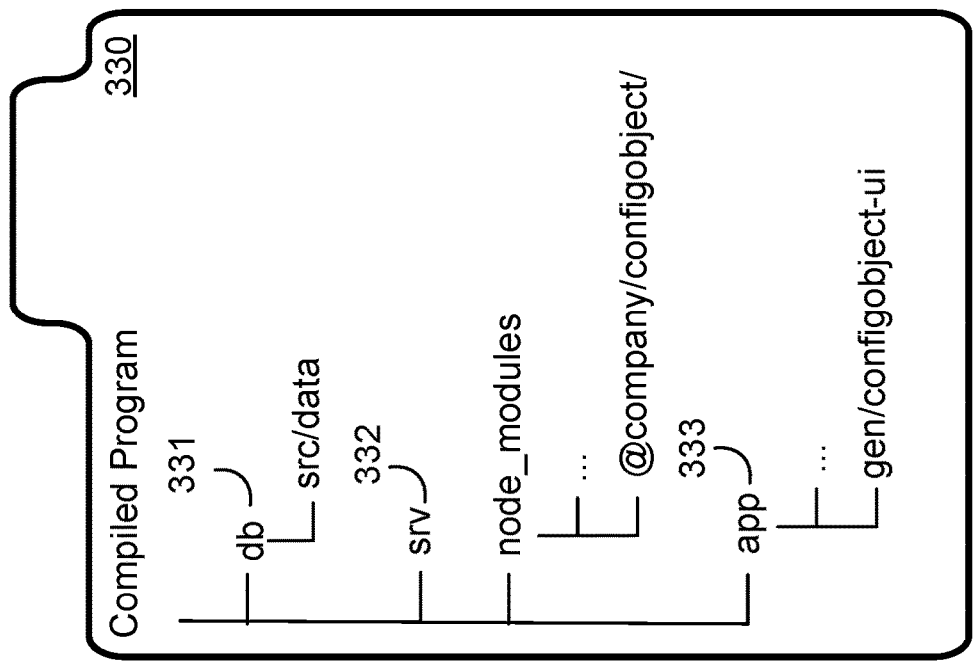
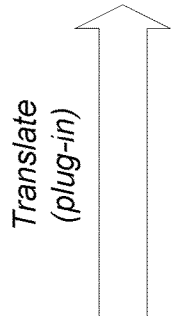
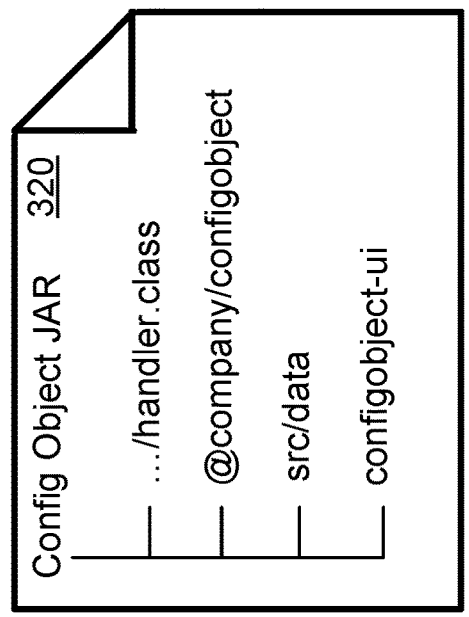
FIG. 3B

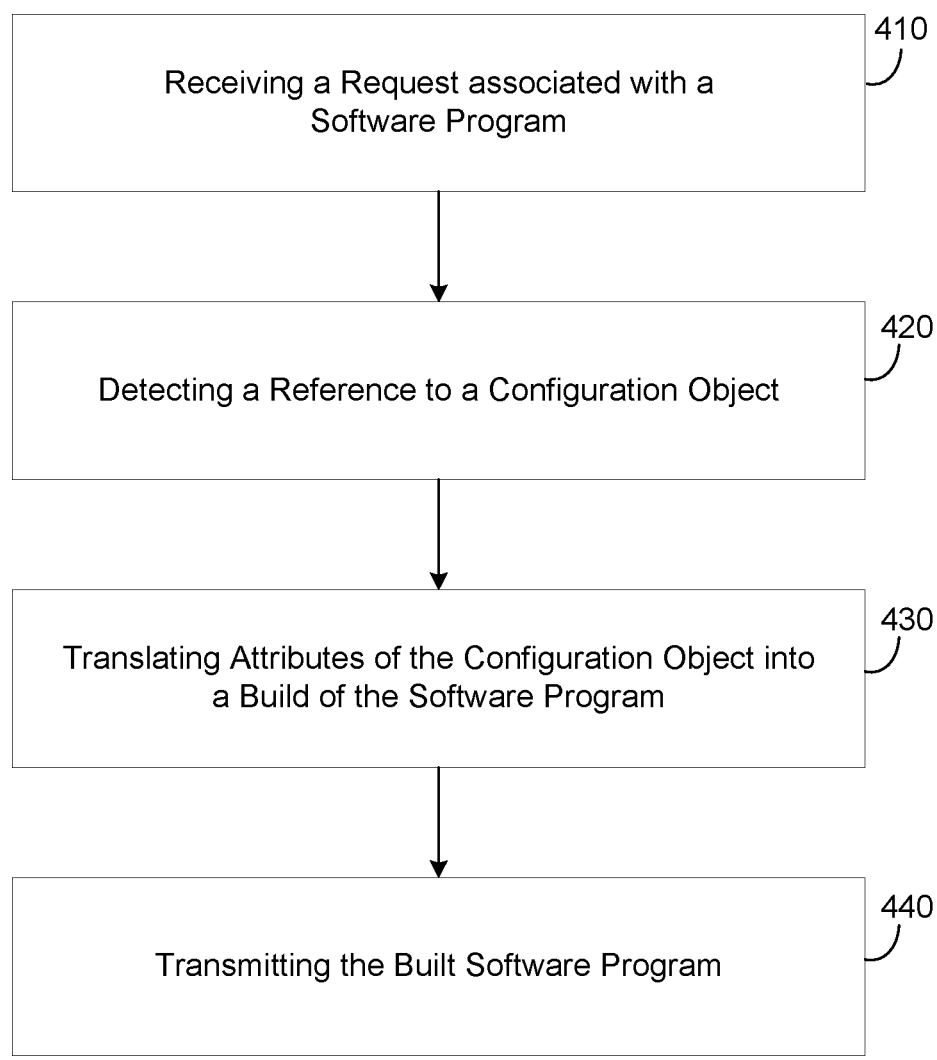

CONFIGURATION CONTENT INTEGRATION

BACKGROUND

In a monolithic software application, all processes are tightly coupled and run as a single service. Meanwhile, in a microservices architecture, an application is broken up and each application process is run as its own microservice (or service). The microservices architecture is commonly employed by cloud computing environments. Each microservice may be built for a specific business capability or function. Because they are independent, each microservice can be updated, deployed, and scaled to meet demand for specific functions of an application.

In a microservices architecture, each software program (e.g., application, software, etc.) may have its own storage structure (e.g., tables, columns, fields, etc.) for storing business content such as configuration content. The format of the storage structure may be determined by a developer. Each tenant within a microservices architecture may provide a customer with multiple applications. In this example, a customer may subscribe to multiple applications of a tenant. For the customer to have a satisfying experience, the applications must have the same configuration. However, when the storage formats among the services and the applications are different, there is a chance that configuration content may not be properly stored in a consistent manner causing the configurations to be different.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 3A is a diagram illustrating a process of converting a configuration object into a software artifact in accordance with an example embodiment.

FIG. 3B is a diagram illustrating a process of translating the configuration artifact into a software program in accordance with an example embodiment.

FIG. 4 is a diagram illustrating a method of consuming configuration content in accordance with an example embodiment.

Figure 1A:
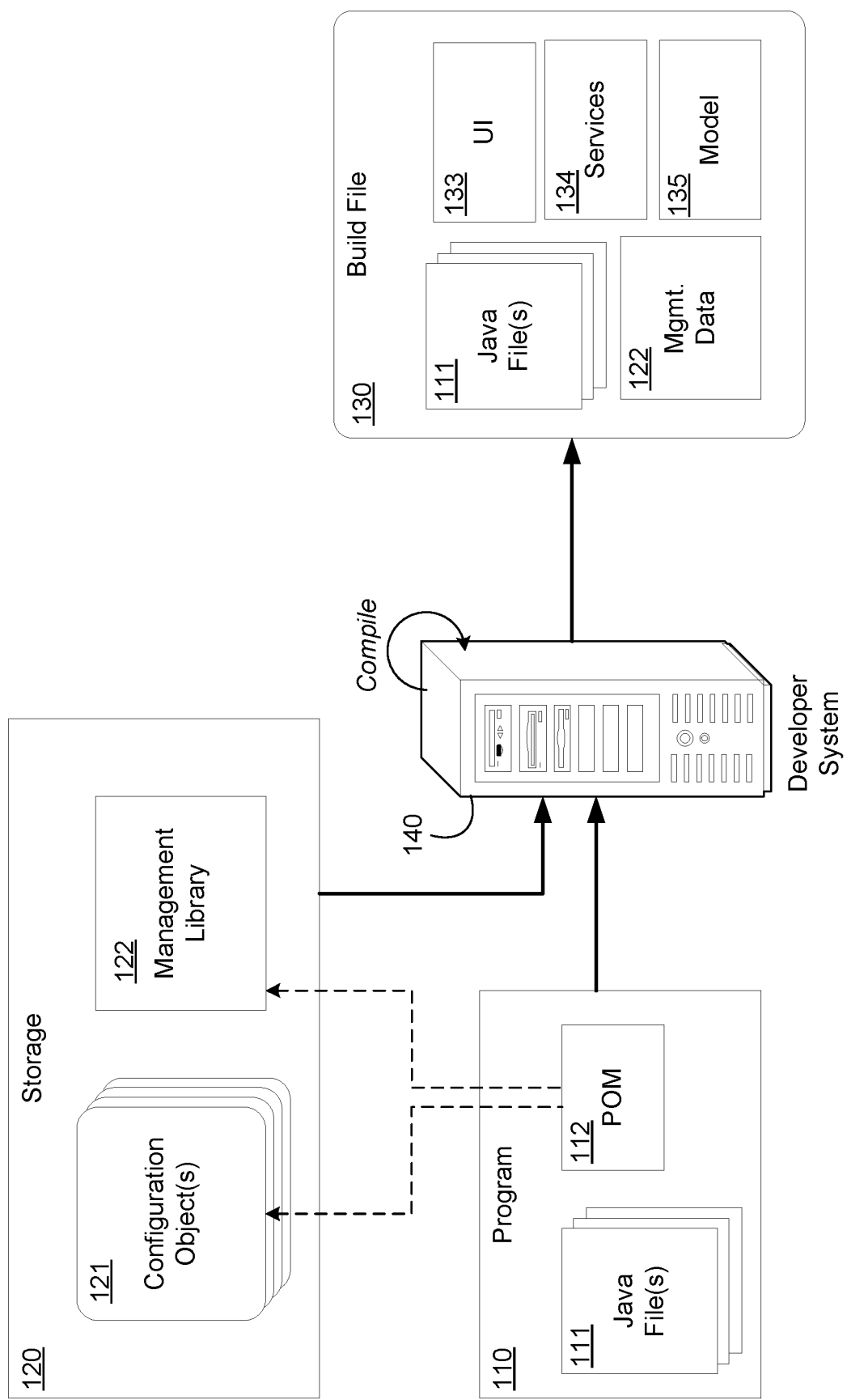
FIG. 1A is a diagram illustrating a computing environment for consuming configuration content in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

A microservices architecture enables a software application to be built as a group of modular components. Each service supports a specific/unique task or business goal of the application and uses a simple well-defined interface such as an application programming interface (API) to communicate with the other services. For example, each service may have its own database and can generate alerts, log data, support user interfaces (UIs), perform authentication and identification, and the like.

Microservices make it easier to test and deploy changes to code. Because each service is separated from the others, fault isolation is also improved. If there is a problem in the software, the problematic service can be isolated, remediated, tested and redeployed without the need to regression test the entire application as with traditional monolithic application architectures. Further, microservices enhance business agility with faster software development and deployment compared to monolithic software architecture. However, microservices still require the same amount of services as a monolithic software product. Therefore, the management for a microservices architecture can be more complex given that each service is independent and not coupled to one another.

A cloud environment may host multiple tenants. Each tenant may have its own schema that dictates a data storage format of the customer data. Furthermore, the tenant may include a plurality of applications that are available to customers. An instance of an application includes a local storage component (application storage). Likewise, an instance of a microservice includes a local storage component. The local storage components include a storage model which indicates a format of the tenant for storing business configuration content that is used by the functions of the application and its services. When an application receives an update to its configuration content, the corresponding microservices must also be updated with consistent configuration content. Before configuration content can be distributed consistently, the system must make sure the application and the services have consistent structures for storing data.

The example embodiments are directed to a system which provides already assembled configuration artifacts that can be consumed by applications and services that are deployed on a host platform in a microservices architecture. The configuration artifacts may include packaged content that can be consumed by the application and/or service during a build phase and prior to being deployed onto the host platform. Thus, each of the application and the services may have the same structure for configuration content.

The example embodiments also provide a mechanism for building the configuration artifacts from underlying folders of content. For example, the configuration content may be included within a set of files providing a description of a user interface, services for accessing the user interface, a description of a model/storage format for storing the business data associated with the function, handlers, and the like. The configuration content from the set of files may be transformed into an archive file, zip file, etc., such as a Java ARchive (JAR) file. The JAR file may be stored on a host platform or some other location, and made available to developers of software applications and services. The JAR file can be downloaded with a single HTTP request rather than downloading all the files of configuration content individually.

When a software program such as an application or a service is developed, the source code may contain a reference to one or more archive files. For example, the source code may include a pointer to a URL, etc. of a location at which the JAR file of the configuration object is stored. When the source code of the software program is compiled, for example, by a Java compiler, the configuration object content within the JAR file may be unpacked and translated into predefined locations (e.g., directories) of the software program during a build of the software program. The resulting build may be deployed to a host platform which accesses the configuration object content to establish a storage format, a user interface, services for accessing the user interface, and the like. Accordingly, by referencing the configuration object within source code of the software program, the configuration content of the software program may be consumed, assembled, and deployed within a host environment.

In the examples herein, the configuration content may be implemented in the form of configuration objects. Different business data such as countries, languages, currencies, and the like, which are accessed by applications and/or services, may have their own configuration objects. The configuration of business data in the configuration objects are used to influence processes of the applications and services that work on other business objects that need to use countries, languages, currencies, etc. As a non-limiting example, an order process for a book can be configured to accept shipment addresses in a specific set of countries. The set of countries may be configured with a "country" configuration object that includes the values of content stored in the underlying tables. In this example, the billing process may behave differently when calculating the shipment price depending on the shipping address due to different shipment costs per country, etc.

For example, the country configuration object may provide ISO codes for different countries that are selected by the tenant in which the 2 letter or 3 letter values of the ISO codes represents the configuration content. This data may be accessed by the functions of the application and its corresponding microservices. Over time, the ISO codes within the configuration object titled "countries" may be changed by adding or deleting ISO codes. For example, the countries configuration object may initially include ISO codes for the United States (US), Germany (DE), and India (IN). At some point, the configuration object may be expanded to include the ISO code for Switzerland (CHE). The original version of the configuration object with three ISO codes and the modified version with four ISO codes may be referred to as different configuration content or different versions of the configuration of the countries configuration object.

The configuration objects may be stored within a software repository provided by the host platform, but are not limited thereto. During the build of a software program, the configuration objects become part of the resulting software program, which is then deployed in the cloud. For example, the build may include generating a deployment-ready multitarget application (MTA) archive file from source code of the software program and the JAR file(s) of configuration objects. An archive builder may translate the content of the configuration object from the JAR file into directories of the MTA archive file. The type of build and the resulting file may depend on a target platform where the software program will be deployed.

During deployment time, the deployment mechanism creates the database tables based on the database models and fills the configuration objects with the initial content based on the model/storage format within the configuration content added to the build. Generally only one version is provided, but also several versions of the configuration might be deployed. During runtime of the service/application more versions of the configuration might be added to the database tables. An application may consume several configuration objects, each having its own respective set of versions of configurations. In some embodiments, the configuration content may be time-dependent having different versions and start and stop times identifying when a particular version is active.

FIG. 1A illustrates a computing environment 100A for consuming configuration content in accordance with an example embodiment. Referring to FIG. 1A, a developer is developing a software program 110 via a developer system 140 such as a desktop computer, laptop, server, database, or the like. The software program 110 may be an application, a service, and the like. In this example, the software program 110 is developed using a programming language such as Java. The program includes a plurality of files 111 with logic therein. The program 110 also includes a reference 112 which may include a project object model (POM). The reference 112 may be added to lines of source code within the files 111. In this example, the reference 112 identifies a dependency of the software program (configuration object 121) and a storage location of the configuration object 121 that is to be consumed by the software program 110 during a build phase of the software program 110. It should also be appreciated that multiple configuration objects may be consumed, or in some cases, the software program 110 may have its own configuration objects already built therein as well.

The developer system 140 may compile the software program 110 via a compiler such as a Java compiler, etc. During the compiling, the developer system 140 may detect the reference 112 and retrieve the referenced configuration object 121. Here, the configuration object 121 may be in a Java ARchive (JAR) file. During the compiling, the developer system 140 may extract the configuration content from the JAR file of the configuration object 121, and add/insert a copy of the configuration content into a build file 130. The build file 130 may be a deployment-ready multitarget application (MTA) archive file which includes the source code (Java files 111) of the software program 110 and configuration attributes from the JAR file(s) of configuration objects 121. The build file 130 may be deployed via a host platform (not shown).

For example, a plug-in may be used to automatically translate the attributes from the configuration object 121 into directories of the build file 130 based on a predetermined mappings of attributes in a JAR file to directories of a MTA file. In some embodiments, the configuration object 121 may be stored in a storage of a software repository offered by a host platform, but embodiments are not limited thereto. The software repository may provide the plug-in for mapping the attributes into the build file 130. Here, the attributes from the JAR file of the configuration object 121 may be unpacked and assembled within directories of the build file 130.

The attributes from the configuration object 121 that are stored within the build file 130 may include a description of a user interface 133 for displaying the data corresponding the configuration object 121, services 134 for accessing the user interface, and a model 135 which describes a storage format of the configuration data such as table names, field names, column names, etc. Also, the attributes from the configuration object 121 may include handler files that perform business checks on the underlying data. The handlers (handler files) may be added to the Java files 111 of the build file 130 during the compilation.

In addition to the configuration object 121, the developer system 140 may also detect a location of a management library 122 (e.g., a business configuration client library) from the POM 112, and add content from the management library to the build file 130. The management library 122 may include instructions for establishing a connection between the deployed program with a central system which updates the configuration object 121 once the software program 110 is running on the host platform.

Figure 1B:
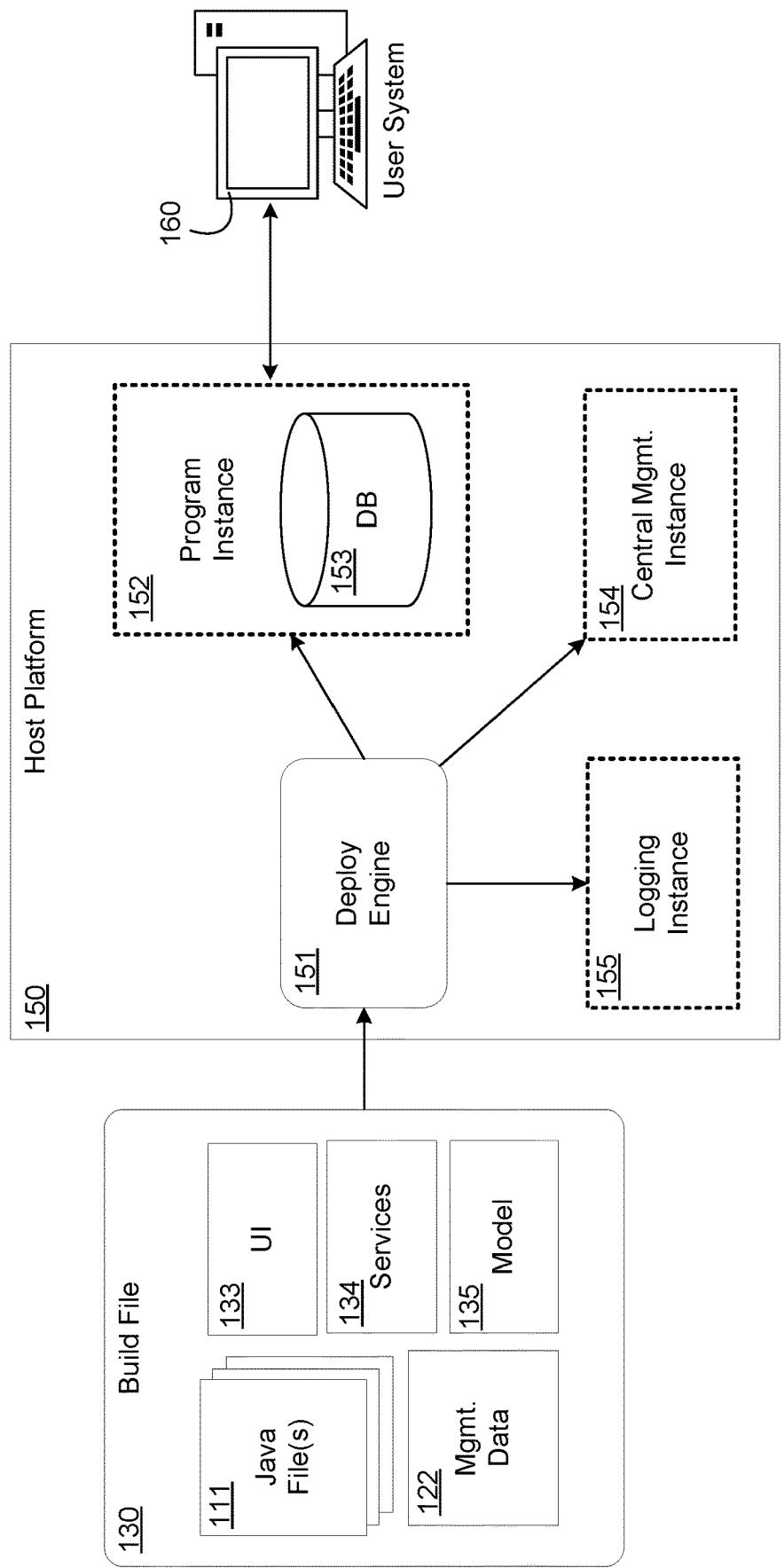
FIG. 1B is a diagram illustrating a computing environment for deploying a software program in accordance with an example embodiment.

FIG. 1B illustrates a computing environment 100B for deploying the build file 130 to a host platform 150 in accordance with an example embodiment. Referring to FIG. 1B, the developer system 140 may transfer the build file 130 to the host platform 150 where it is received by a deployment engine 151 that launches an instance of the program 152 based on the build file 130. The host platform 150 may be a live web-based platform such as a cloud platform, a web server, or the like, and the program instance 152 may be accessible to external users 160 via a web application via a web browser, a mobile application via a mobile device, and the like. The program instance 152 may execute the logic within the Java files 111.

In this example, the deployment engine 151 may be a MTA deployer that picks up the build file 130 and creates the instance 152. The deployment engine 151 may also create tables within a database 155 of the program instance 152 based on a storage format of the model 135 in the build file 130. The user interface 133 data may be stored within an HTML repository (not shown) for subsequent access. The services 134 may be compiled when generating the build file 130 in FIG. 1A, and interpreted by an interpreter (not shown) which understands what the tables in the database 152 look like based on the model 135, thereby allowing CRUD operations (create, read, update, and delete) on the object data. In addition, the deployment engine 151 creates a management instance 154 for managing updates to the configuration content of the program instance 152 during runtime. Here, the management instance 154 may connect the program instance 152 with a central configuration system (not shown) that can provide updates to the configuration content. The deployment engine 151 may also generate a logging service instance 155 for logging operations of the program instance 152.

In order for an application 160 and its underlying microservices (shown in the example of FIG. 1C) to work consistently, the configuration content across the application 160 and the microservices needs to be consistent.

Figure 1C:
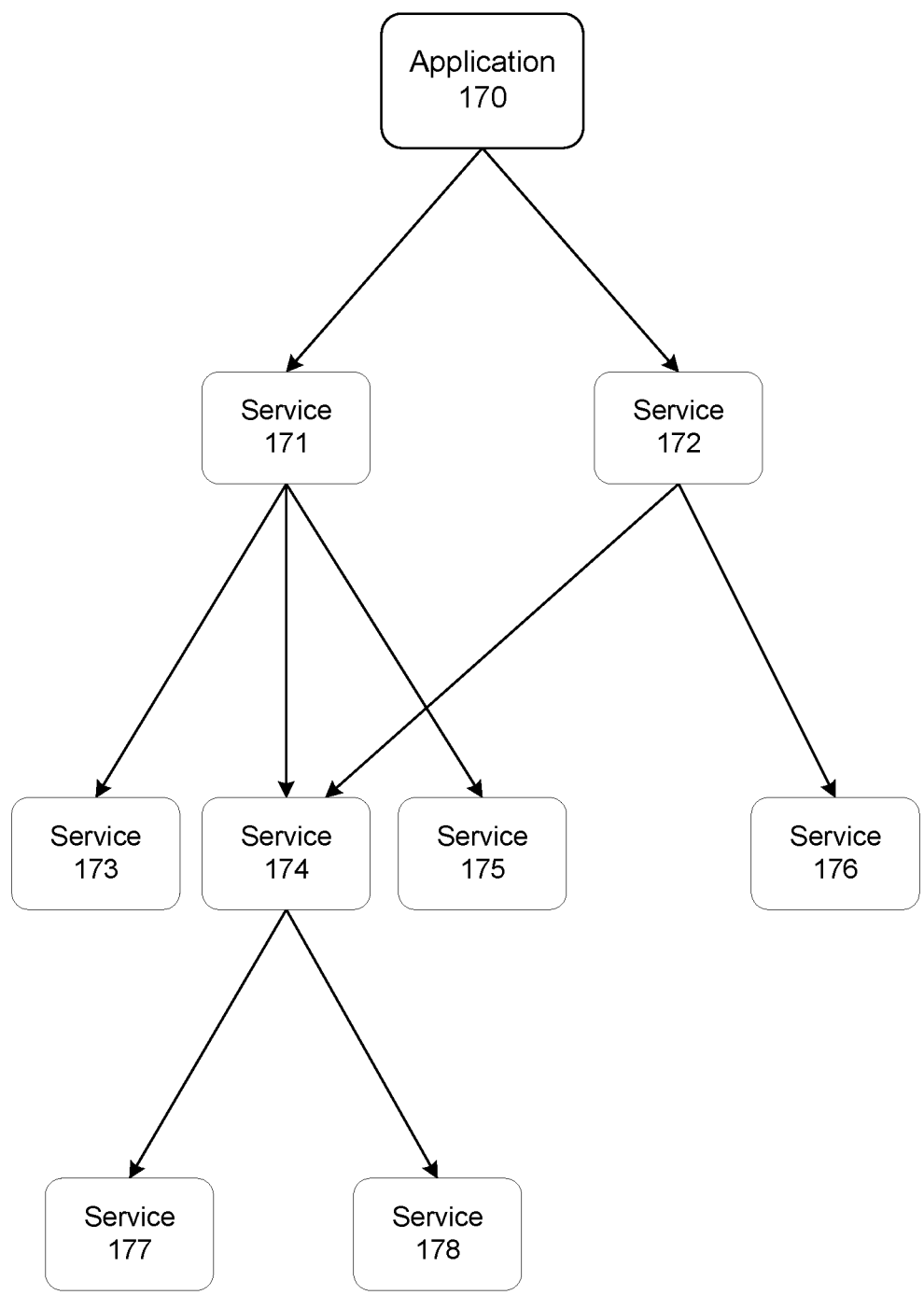
FIG. 1C is a diagram illustrating a microservices architecture in accordance with an example embodiment.

FIG. 1C illustrates a microservices architecture 100C in accordance with an example embodiment. For example, the microservices architecture 100C may be implemented within a cloud computing environment (e.g., Cloud Foundry, etc.) which is based on a microservices architecture. Referring to FIG. 1C, an application 170 is built with a plurality of modular components (i.e., services 171-178) which implement the functionality of the application 170. Any of the application 170 and the services 171-178 may correspond to the software program 110 shown in FIG. 1A and deployed as program instance 152 in FIG. 1B. Here, the different services 171-178 perform different/unique functions and collaborate together to perform application tasks for the application 170. Also, the different services 171-178 may be provided independently of the application 170 and may perform tasks for other applications which are not shown. As described herein, the application 170 and the services 171-178 may be generally referred to as software artifacts.

In the example of FIG. 1C, the different services 171-178 are shown in a hierarchical graph. However, it should be appreciated that the services 171-178 may also interact with one another. For example, a service from among the different services 171-178 can call another one of the services from among the different services 171-178, creating a cascading effect. Therefore, instead of a hierarchical graph, as another example, the services 171-178 may be represented with an acyclic directed graph (ADG).

In the example of the microservices architecture 100C of FIG. 1C, the application 170 functionality is distributed across the different services 171-178. In other words, the application 170 consumes the services 171-178 to provide functionality for the application 170. The application 170 and each of the services 171-198 may have their own storage such as a database, a cache, etc. which can be used to hold configuration objects and configuration content therein.

As one example, the application 170 may be a sales order application that consumes a pricing service and a business partner service. Here, a customer may use the sales order application to conduct business in the US, Germany, and India. To work properly, the sales order application and the corresponding services must be configured with the same set of countries. As one example, the country data may be stored in a countries configuration object and content of the configuration may be stored in a table, etc. The countries object may then be recorded within the local storages of the application and the services.

Figure 2:
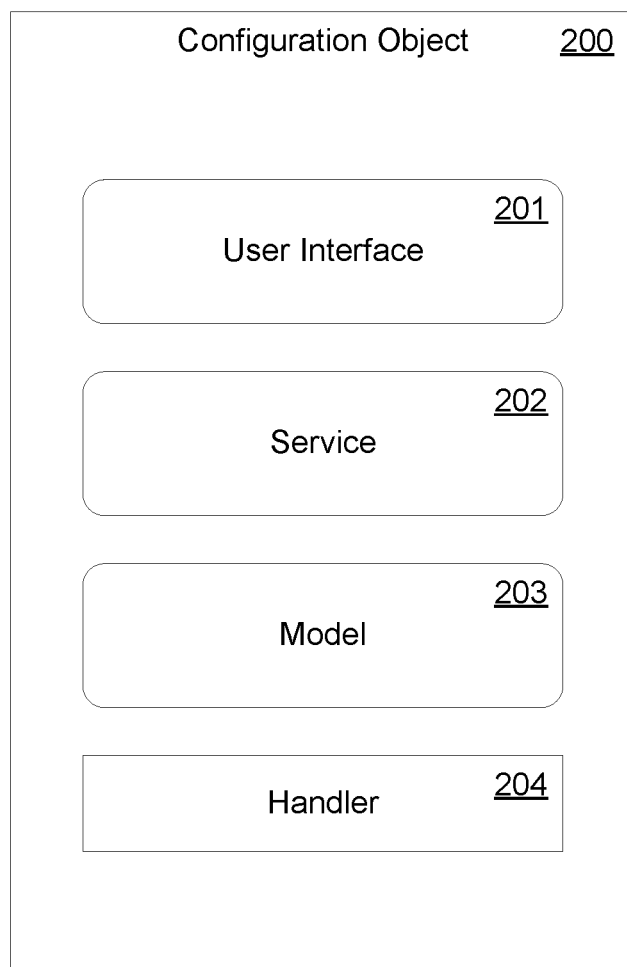
FIG. 2 is a diagram illustrating an architecture of a configuration object in accordance with an example embodiment.

FIG. 2 illustrates an architecture of a configuration object 200 in accordance with an example embodiment. For example, the configuration object 200 may be the configuration object 121 in FIG. 1A that has been packaged as described in FIG. 3A. Referring to FIG. 2, the configuration object 200 is a software artifact that handles configuration data which can be integrated into different software applications, services, and the like. The configuration object 200 may include user interface content 201 which provides information about displaying the content of the configuration object, services 202 for accessing the content, and a model 203 which includes metadata describing the structure for storing configuration content such as field names, field descriptions, data types, key attributes, and the like. The configuration object 200 may store its content in one or more tables. The tables may be located within the respective applications/services where the configuration object is incorporated. The model 203 may hold a storage format of the tables. The services 202 may include OData services, etc., for accessing the configuration content from the tables.

The configuration object 200 may also include a request handler 204 that is written in Java, for example. The request handler 204 may include business logic that runs when the tables are accessed by the services 202. The handlers 204 may be added to the Java files 111 during the compilation of the build file 130 shown in FIGS. 1A-1B. The components 201, 202, 203, and 204 of the configuration object 200 may be packed into a Java Archive (JAR) file which can be transferred to applications and services. In some embodiments, the configuration object 200 may be associated with multiple applications of a tenant on the host platform. Furthermore, different applications may share access to one or more configuration objects.

A lifecycle of the configuration object 200 may include a development phase where the elements of the configuration are developed (e.g., UI 201, service 202, model 203, handlers 204, etc.) The lifecycle may also include a build phase where the elements are compiled by the respective compilers during a build process. The result is a software artifact (archive) which is referred to herein as the configuration object. The configuration object 200 may be deployed to a software repository. In addition, the lifecycle may include a consumption phase during which the configuration object 200 is consumed by an application and/or a service during a build time. In this phase, the configuration object 200 may be read from the software repository and its elements may be integrated into the service/application source code and/or libraries.

Meanwhile, a lifecycle of a software (application, service, etc.) may include a development phase where the artifacts, such as source code, are created. In addition, the software may include a build phase during which the source code (and other artifacts, if appropriate) are compiled and a software artifact (archive) is created. During the build phase, the configuration objects (such as configuration object 200) that is consumed by the application may be read from the software repository and integrated into the application/service source code. In addition, the software may include a deployment phase where the software archive of the service/application is deployed to a host platform such as a cloud environment, database tables, and the like.

In some embodiments, if the application/service is working with a configuration repository, the application/service may register the configuration objects that it uses with configuration repository such that configuration repository knows which application/service to update with new versions of configuration. The software may also include a running phase where the application/service is running and it can access the configurations stored in the database tables that were created for the consumed configuration objects.

Over time, a configuration object that is used by a tenant may be changed. The change may occur while the applications that rely on the configuration object are already running on a host platform (during runtime). In this case, the modification to the configuration object should be propagated to the applications and the corresponding microservices. That is, the modifications to the configuration objects should be distributed to the local storages of the respective applications and microservices that use the configuration object.

FIG. 3A illustrates a process 300A of converting a configuration object 310 into a software artifact 320 in accordance with an example embodiment. Referring to FIG. 3A, before the configuration object 310 may be consumed by a software program such as an application or a service, the configuration object content may be converted into an archive format. In this example, the configuration object 310 is initial a set of files. For example, the configuration object 310 may include a model that describes (e.g., in CDS syntax) the entities and entity attributes such as tables and columns therein that need to be created in the database 311 to store the configuration for this configuration object 310. CDS syntax provides for defining tables, views, data types, and associations in a database.

The configuration object 310 also includes a user interface description 313 and a service 312 which is accessed via the user interface and which reads/writes data from underlying database tables using the model. The service 312 may be an OData service that is also described using a CDS file. The configuration object 310 also includes handlers 314 which is Java code that is run when the tables are accessed by the services 312 and which performs checks on the data. The configuration object 310 may have a standardized format with user-defined content stored therein.

As shown in FIG. 3A, the contents of the configuration object 310 are converted into a JAR file 320 during an initial build. The JAR file 320 is a file format based on a ZIP file format and is used for aggregating files into one file. The result is a single file that can be downloaded or transferred through a single HTTP transaction rather than opening a new connection for each file. The JAR file 320 also supports compression which reduces the size of the file and improves the time it takes to download/transfer the file. The JAR format is defined in the JAR File Specification. The resulting JAR file 320 includes the contents/files of the configuration object 310 in a zipped format. In some embodiments, the JAR file 320 may be a Maven build as defined by the Apache Maven Project.

FIG. 3B illustrates a process 300B of translating the configuration software artifact into a software program in accordance with an example embodiment. Referring to FIG. 3B, the JAR file 320 created in the process 300A of FIG. 3A is consumed by a software program 330 (also referred to as a software project) during a build phase of the software program 330. For example, the configuration object components may be extracted from the JAR file 320 and copied into predefined directories of the software program 330 during a compile of the software program 330. Here, the CDS model and the CDS services are compiled from the CDS build, and the Java handler is included as a library. The UI is added to a directory which includes other UIs of the software program 330. As a result, the content of the configuration object 310 is integrated within the software program 330 during a compile of the software program 330. The compiled software program may be transmitted to and deployed on a host platform such as a web server, a cloud, a database, and the like.

In this example, the data model file is added to a database directory 331, the services are added to a services directory 332, and the UI is added to an application directory 333 with other UIs stored therein. In some embodiments, the mapping of packed files from the JAR file 320 to the software program 330 may be performed by a plug-in that is offered by the software repository where the configuration objects 310 and/or JAR file 320 are stored. The plug-in may unpack or unzip folders from the JAR file 320 and insert the unpacked folders into the correct directories of the software program 330 during compilation. In some embodiments, the compiled software program 330 may be a deployment-ready MTA archive file.

FIG. 4 illustrates a method 400 of consuming configuration content in accordance with an example embodiment. For example, the method 400 may be performed by a database node, a cloud platform, a server, a computing system (user device), a combination of devices/nodes, or the like. Referring to FIG. 4, in 410, the method may include receiving a request associated with a software program via a host platform. For example, the request may be an input via a user interface, a request from another software program, a request from another system received via a network, or the like. The software program may be an application, a service, or the like, which is to be deployed on a host platform.

In 420, the method may include detecting a reference to a configuration object within a file of the software program. For example, the reference may include a pointer that identifies that the software program is dependent one the configuration object as well as a storage location of the configuration object. In some embodiments, the detecting may include detecting the reference to the configuration object within a product object model (POM) of the software program.

In 430, the method may include translating attributes of the configuration object into predefined locations of the software program during a build of the software program. In some embodiments, the translating may include extracting one or more of a description of a table format of configuration data, a description of a user interface, services for accessing the user interface, handlers for performing business checks on the configuration data, and the like, from the configuration object and storing the extracted attributes in a predefined directory of the software program. The configuration object may be packaged in an archive file such as a JAR file or other zip file. The translating may include unpacking or unzipping the attributes of the configuration object from the JAR file/zip file, and storing/assembling the attributes within predefined directories of a MTA file. In 440, the method may include deploying the built software program on the host platform with the transformed attributes of the configuration object incorporated therein.

In some embodiments, the method may further include building the archive file which includes the configuration object, wherein the building may include extracting content from one or more folders and assemble the extracted contents into the archive file. In some embodiments, the translating may include unzipping the attributes from the archive file and storing the unzipped attributes in one or more directories of the software program. In some embodiments, the method may further include executing a plug-in which automatically maps the attributes from the configuration object into the predefined locations of the software program. In some embodiments, the method may further include transmitting an identification of the software program and an identification of the configuration object to a central system that manages updates to the configuration object.

Figure 5:
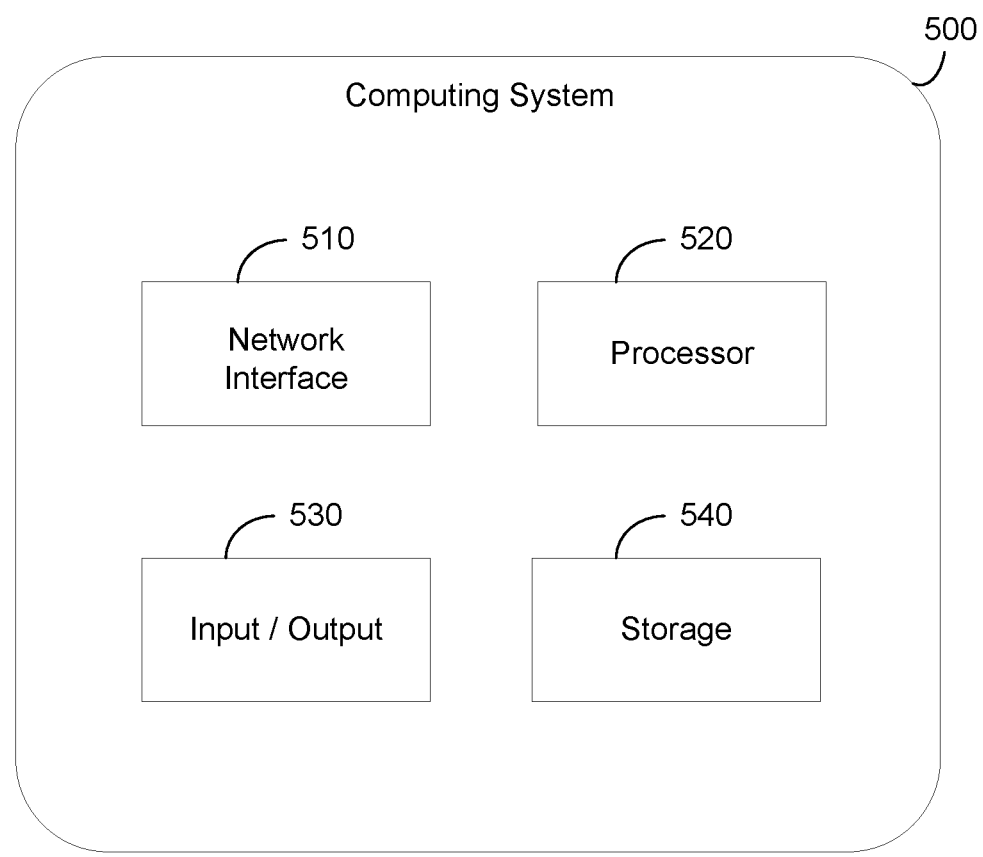
FIG. 5 is a diagram illustrating a computing system for use in the examples herein in accordance with an example embodiment.

FIG. 5 illustrates a computing system 500 that may be used in any of the methods and processes described herein, in accordance with an example embodiment. For example, the computing system 500 may be a database node, a server, a cloud platform, or the like. In some embodiments, the computing system 500 may be distributed across multiple computing devices such as multiple database nodes. Referring to FIG. 5, the computing system 500 includes a network interface 510, a processor 520, an input/output 530, and a storage device 540 such as an in-memory storage, and the like. Although not shown in FIG. 5, the computing system 500 may also include or be electronically connected to other components such as a display, an input unit(s), a receiver, a transmitter, a persistent disk, and the like. The processor 520 may control the other components of the computing system 500.

The network interface 510 may transmit and receive data over a network such as the Internet, a private network, a public network, an enterprise network, and the like. The network interface 510 may be a wireless interface, a wired interface, or a combination thereof. The processor 520 may include one or more processing devices each including one or more processing cores. In some examples, the processor 520 is a multicore processor or a plurality of multicore processors. Also, the processor 520 may be fixed or it may be reconfigurable. The input/output 530 may include an interface, a port, a cable, a bus, a board, a wire, and the like, for inputting and outputting data to and from the computing system 500. For example, data may be output to an embedded display of the computing system 500, an externally connected display, a display connected to the cloud, another device, and the like. The network interface 510, the input/output 530, the storage 540, or a combination thereof, may interact with applications executing on other devices.

The storage device 540 is not limited to a particular storage device and may include any known memory device such as RAM, ROM, hard disk, and the like, and may or may not be included within a database system, a cloud environment, a web server, or the like. The storage 540 may store software modules or other instructions which can be executed by the processor 520 to perform the method shown in FIG. 4. According to various embodiments, the storage 540 may include a data store having a plurality of tables, partitions and sub-partitions. The storage 540 may be used to store database records, items, entries, and the like. In some embodiments, the storage 540 may be configured to store instructions for managing a configuration repository for a distributed system.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
    a network interface configured to receive a request associated with a software program; and
    a processor configured to
        detect a reference to a uniform resource locator (URL) of a configuration object within source code of the software program;
        retrieve the configuration object via the URL;
        translate attributes of the configuration object retrieved via the URL into predefined locations of the software program during a build of the software program; and
        transmit the built software program to a host platform with the translated attributes of the configuration object incorporated therein.

2. The computing system of claim 1, wherein the processor is configured to extract table names and field names of configuration data from the configuration object and store the extracted table names and field names in a predefined directory of the software program.

3. The computing system of claim 1, wherein the processor is configured to extract a description of a user interface of the configuration object and a service that is called by the user interface and store the extracted description of the user interface and the service in a predefined directory of the software program.

4. The computing system of claim 1, wherein the processor is configured to build an archive file which includes the configuration object, wherein the processor extracts content from one or more folders and assemble the extracted contents into the archive file.

5. The computing system of claim 4, wherein the translating comprises unzipping the attributes from the archive file and storing the unzipped attributes in one or more directories of the software program.

6. The computing system of claim 1, wherein the processor is configured to detect the reference to the URL of the configuration object within a product object model (POM) of the software program.

7. The computing system of claim 1, wherein the processor is configured to execute a plug-in which automatically maps the attributes from the configuration object into the predefined locations of the software program.

8. The computing system of claim 1, wherein the processor is further configured to retrieve a Java Archive (JAR) file comprising the configuration object from a software repository based on the URL of the configuration object included within the source code.

9. The computing system of claim 1, wherein the processor is configured to translate the attributes of the configuration object retrieved from the URL into a plurality of different services which share access to the configuration object via the URL.

10. A method comprising:
    receiving a request associated with a software program;
    detecting a reference to a uniform resource locator (URL) of a configuration object within source code of the software program;
    retrieving the configuration object via the URL;
    translating attributes of the configuration object retrieved via the URL into predefined locations of the software program during a build of the software program; and
    transmitting the built software program to a host platform with the translated attributes of the configuration object incorporated therein.

11. The method of claim 10, wherein the translating comprises extracting table names and field names of configuration data from the configuration object and storing the table names and field names in a predefined directory of the software program.

12. The method of claim 10, wherein the translating comprises extracting a description of a user interface of the configuration object and a service that is called by the user interface and storing the description of the user interface and the service in a predefined directory of the software program.

13. The method of claim 10, further comprising building an archive file which includes the configuration object, wherein the building comprises extracting content from one or more folders and assemble the extracted contents into the archive file.

14. The method of claim 13, wherein the translating comprises unzipping the attributes from the archive file and storing the unzipped attributes in one or more directories of the software program.

15. The method of claim 10, wherein the detecting comprises detecting the reference to the URL of the configuration object within a product object model (POM) of the software program.

16. The method of claim 10, further comprising executing a plug-in which automatically maps the attributes from the configuration object into the predefined locations of the software program.

17. The method of claim 10, further comprising retrieving a Java Archive (JAR) file comprising the configuration object from a software repository based on the URL of the configuration object included within the source code.

18. A non-transitory computer-readable medium comprising instructions which when executed by a processor cause a computer to perform a method comprising:
    receiving a request associated with a software program;
    detecting a reference to a uniform resource locator (URL) of a configuration object within source code of the software program;
    retrieving the configuration object via the URL;
    translating attributes of the configuration object retrieved via the URL into predefined locations of the software program during a build of the software program; and
    transmitting the built software program to a host platform with the transformed attributes of the configuration object incorporated therein.

19. The non-transitory computer-readable medium of claim 18, wherein the translating comprises extracting table names and field names of configuration data from the configuration object and storing the table names and field names in a predefined directory of the software program.

20. The non-transitory computer-readable medium of claim 18, wherein the translating comprises extracting a description of a user interface of the configuration object and a service that is called by the user interface and storing the description of the user interface and the service in a predefined directory of the software program.

21. The non-transitory computer-readable medium of claim 18, wherein the method further comprises building an archive file which includes the configuration object, and the building comprises extracting content from one or more folders and assemble the extracted contents into the archive file.

* * * * *